(12) United States Patent
Scheid

(10) Patent No.: US 10,304,262 B2
(45) Date of Patent: May 28, 2019

(54) AIRCRAFT DATA MANAGEMENT SYSTEM AND METHOD

(71) Applicant: United Technologies Corporation, Farmington, CT (US)

(72) Inventor: Paul Raymond Scheid, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/275,550

(22) Filed: Sep. 26, 2016

(65) Prior Publication Data

US 2018/0089910 A1 Mar. 29, 2018

(51) Int. Cl.
*G07C 5/08* (2006.01)
*G06Q 10/00* (2012.01)
*G06Q 10/08* (2012.01)
*G06Q 50/04* (2012.01)

(52) U.S. Cl.
CPC ............. *G07C 5/08* (2013.01); *G06Q 10/00* (2013.01); *G06Q 10/087* (2013.01); *G06Q 10/0875* (2013.01); *G06Q 50/04* (2013.01); Y02P 90/30 (2015.11)

(58) Field of Classification Search
CPC ...................................................... G07C 5/08
See application file for complete search history.

(56) References Cited

U.S. PATENT DOCUMENTS

2008/0030370 A1  2/2008  Doyle

FOREIGN PATENT DOCUMENTS

EP  2434450 A1  3/2012
EP  2479718 A1  7/2012

OTHER PUBLICATIONS

Dunsdon et al., "The Application of Open System Architecture for Condition Based Maintenance to Complete IVHM", 2008 IEEE Aerospace Conference, Mar. 2008, pp. 1-9. (Year: 2008).*
European Search Report Issued in EP Application No. 17193175.1, dated Oct. 30, 2017, 9 Pages.

* cited by examiner

*Primary Examiner* — Todd M Melton
(74) *Attorney, Agent, or Firm* — Cantor Colburn LLP

(57) ABSTRACT

A method of data collection and reporting for a vehicle fleet includes defining a master reporting template at an original equipment manufacturer. The master reporting template includes one or more original equipment manufacturer report structures for original equipment manufacturer use. The master reporting template is communicated from the original equipment manufacturer to one or more vehicle operators. An inherited reporting template is defined at the vehicle operator including the one or more original equipment manufacturer report structures and one or more vehicle operator report structures for vehicle operator use. Data is collected from one or more vehicles of the vehicle fleet at a data hub via a data port at the one or more vehicles. The data collection is based on the contents of the inherited reporting template.

19 Claims, 7 Drawing Sheets

AIRCRAFT DATA MANAGEMENT SYSTEM AND METHOD

BACKGROUND

The present disclosure relates to vehicles and vehicle systems, and more particularly to data collection and reporting from vehicle and vehicle systems.

Vehicle original equipment manufacturers (OEMs), such as aircraft manufacturers or engine manufacturers, collect data from their equipment in service during the equipment operation by users to monitor health of the equipment and to, for example, make design improvements based on the collected data. To collect the desired data, OEM's define OEM vehicle data reports. Vehicle operators, such as airlines or cargo companies, similarly define operator data reports to understand the health of their fleet of vehicles.

The specific data collected by the OEM and vehicle operator often differs greatly, as does the data reported and the form of the reports generated for use by the OEM and by the vehicle operator. The management of the reports, such as any updating or revisions thereof, is largely done on an ad-hoc basis, and is difficult to manage across a large population of vehicle operators. OEMs and vehicle operators typically coordinate their efforts manually associated with changes and updates to the vehicle health reports. This can result in an ineffectiveness of the data reporting and/or delays in reporting desired data to the OEM or the vehicle operator.

SUMMARY

In one embodiment, a method of data collection and reporting for a vehicle fleet includes defining a master reporting template at an original equipment manufacturer. The master reporting template includes one or more original equipment manufacturer report structures for original equipment manufacturer use. The master reporting template is communicated from the original equipment manufacturer to one or more vehicle operators. An inherited reporting template is defined at the vehicle operator including the one or more original equipment manufacturer report structures and one or more vehicle operator report structures for vehicle operator use. Data is collected from one or more vehicles of the vehicle fleet at a data hub via a data port at the one or more vehicles. The data collection is based on the contents of the inherited reporting template.

Additionally or alternatively, in this or other embodiments completed reports based on the master reporting template are communicated from the vehicle operator to the original equipment manufacturer.

Additionally or alternatively, in this or other embodiments the master reporting template is communicated to two or more vehicle operators. A first vehicle operator defines a first inherited reporting template having a first set of vehicle operator report structures, and a second vehicle operator defines a second inherited reporting template having a second set of operator report structures different from the first set of vehicle operator report structures.

Additionally or alternatively, in this or other embodiments the method includes modifying the master reporting template, communicating the master reporting template from the original equipment manufacturer to one or more vehicle operators, and adding the one or more vehicle operator report structures to the master reporting template at the one or more vehicle operators defining a revised inherited reporting template.

Additionally or alternatively, in this or other embodiments the master reporting template is definable only at the original equipment manufacturer.

Additionally or alternatively, in this or other embodiments the master reporting template is definable only at the original equipment manufacturer.

Additionally or alternatively, in this or other embodiments the vehicle fleet is an aircraft fleet.

Additionally or alternatively, in this or other embodiments the one or more original equipment manufacturer report structures include one or more of oil condition report, a gaspath temperature and pressure report, a FADEC condition report, a hydraulic system report, or a flight control system report.

In another embodiment, a data collection and reporting system for a vehicle fleet includes an original equipment manufacturer data center including a master reporting template defined by the original equipment manufacturer. The master reporting template includes one or more original equipment manufacturer report structures for original equipment manufacturer use. The system further includes a vehicle operator data center including one or more vehicle operator report structures for vehicle operator use. The master reporting template and the one or more vehicle operator report structures together define an inherited reporting template for the vehicle operator. A data hub is operably connectable to selected vehicles of the vehicle fleet and is configured to collect data from the selected vehicles, communicate collected data to the vehicle operator data center per the one or more vehicle operator report structures, and communicate collected data to the original equipment manufacturer data center per the one or more original equipment manufacturer report structures.

Additionally or alternatively, in this or other embodiments the system includes a data port at each vehicle of the vehicle fleet. The vehicle is configured for direct communication with the data hub via the data port.

Additionally or alternatively, in this or other embodiments the data port is configured to communicate data collection requirements from the data hub to the vehicle and receive collected data from the vehicle.

Additionally or alternatively, in this or other embodiments two or more vehicle operator data centers are operably connected to the data hub.

Additionally or alternatively, in this or other embodiments a first vehicle operator data center of the two or more vehicle operator data centers includes a first set of vehicle operator report structures, and a second vehicle operator data center of the two or more vehicle operator data centers includes a second set of vehicle operator report structures different from the first set of vehicle operator report structures.

Additionally or alternatively, in this or other embodiments the master reporting template is configured for modification only by the original equipment manufacturer.

Additionally or alternatively, in this or other embodiments the vehicle fleet is an aircraft fleet.

Additionally or alternatively, in this or other embodiments the one or more original equipment manufacturer report structures include one or more of oil condition report, a gaspath temperature and pressure report, a FADEC condition report, a hydraulic system report, or a flight control system report.

In yet another embodiment, a vehicle fleet includes a plurality of vehicles manufactured by an original equipment manufacturer and operated by one or more vehicle operators and a data collection and reporting system in selective operable communication with the plurality of vehicles. The data collection and reporting system includes an original equipment manufacturer data center including a master reporting template defined by the original equipment manufacturer. The master reporting template includes one or more original equipment manufacturer report structures for original equipment manufacturer use. The system further includes a vehicle operator data center including one or more vehicle operator report structures for vehicle operator use. The master reporting template and the one or more vehicle operator report structures together define an inherited reporting template for the vehicle operator. A data hub is operably connectible to selected vehicles of the vehicle fleet and is configured to collect data from the selected vehicles, communicate collected data to the vehicle operator data center per the one or more vehicle operator report structures, and communicate collected data to the original equipment manufacturer data center per the one or more original equipment manufacturer report structures.

Additionally or alternatively, in this or other embodiments two or more vehicle operator data centers are operably connected to the data hub and a first vehicle operator data center of the two or more vehicle operator data centers includes a first set of vehicle operator report structures and a second vehicle operator data center of the two or more vehicle operator data centers includes a second set of vehicle operator report structures different from the first set of vehicle operator report structures.

Additionally or alternatively, in this or other embodiments the one or more original equipment manufacturer report structures include one or more of oil condition report, a gaspath temperature and pressure report, a FADEC condition report, a hydraulic system report, or a flight control system report.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
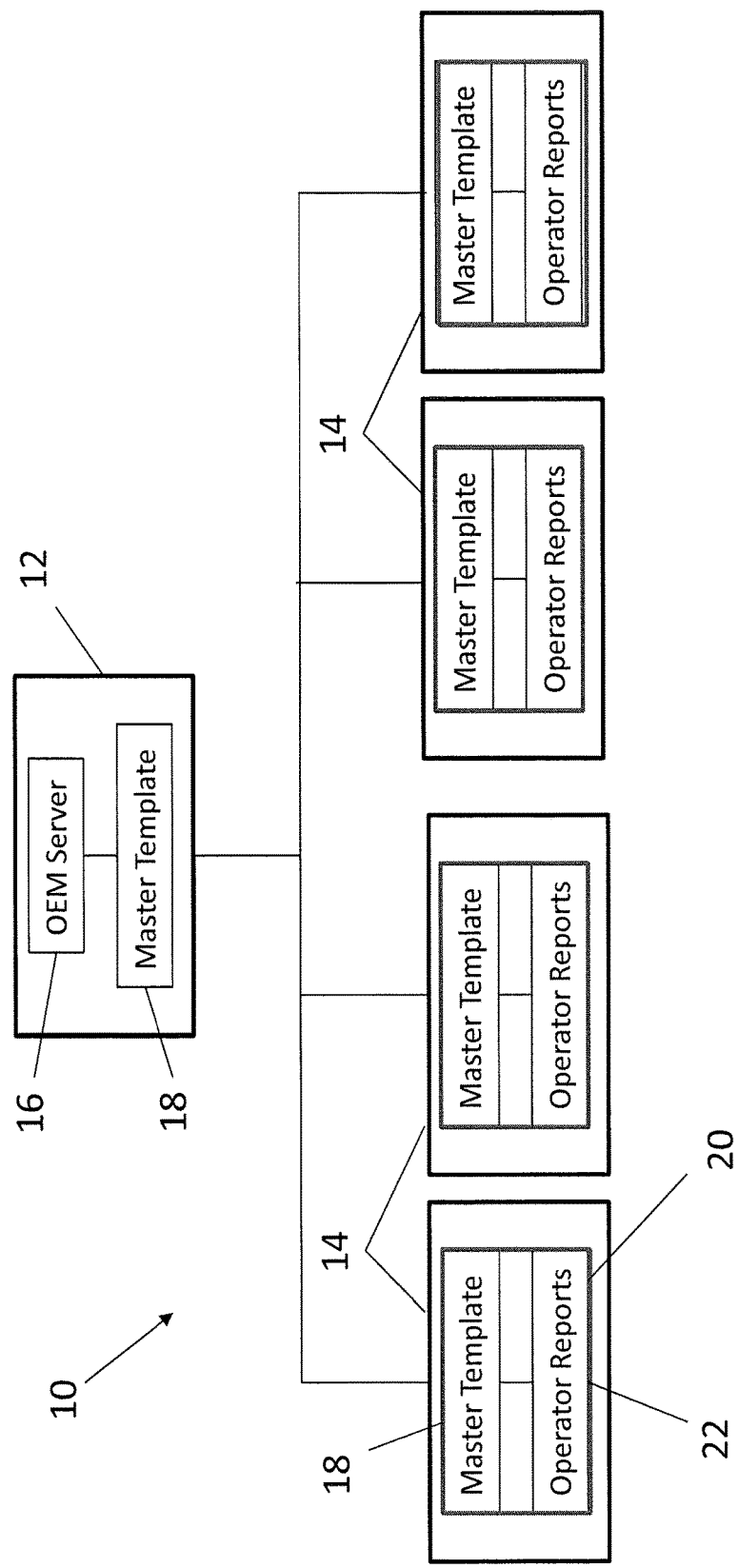
FIG. 1 is a schematic illustration of a data collection and reporting system hierarchy.

Shown in FIG. 1 is a schematic illustration of a data collection and reporting system 10 for a vehicle fleet having an original equipment manufacturer (OEM) 12 and one or more vehicle operators 14. The OEM 12 has a data storage and processing center, such as an OEM server 16 at which data reports from the vehicle operators 14 is developed and processed. The data collection and reporting for the OEM 12 is defined by an access-controlled master reporting template 18 that is communicated to each of the vehicle operators 14. The master reporting template 18 is an inherited reporting template 20 to each of the vehicle operators 14, to which each vehicle operator 14 may add one or more operator-specific reports 22.

Figure 2:
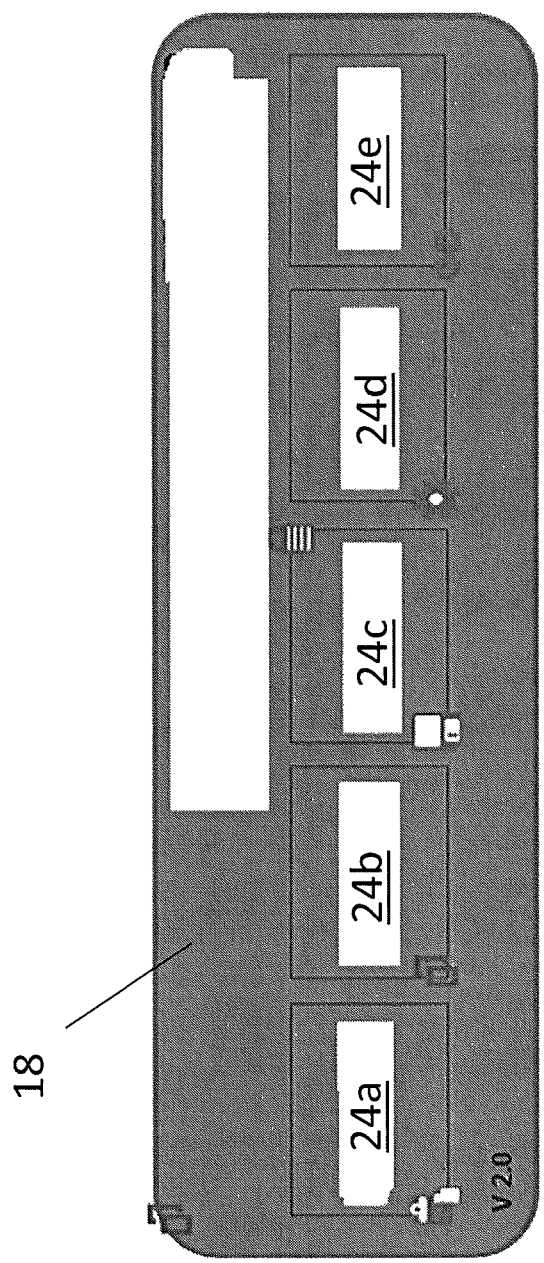
FIG. 2 is a schematic view of a master reporting template.

Referring now to FIG. 2, the master reporting template 18 includes one or more OEM reports, shown in FIG. 2 as 24a-24e. The reports 24a-24e may correspond to, for example, an oil condition report 24a, a gaspath temperature and pressure report 24b, a FADEC condition report 24c, a hydraulic system report 24d and a flight control system report 24e. It is to be appreciated that the included reports are merely exemplary, and the master reporting template may include other numbers of reports relating to other vehicle systems and structures.

The master reporting template 18 can only be created or modified by OEM personnel, but specific reports 24a-24e may have different permissions for a single user at the OEM 12. For example, as shown in FIG. 2, a particular OEM personnel may have read only permission for report 24a, copy permission for report 24b, modify permission for report 24c, full access permission for report 24d, and masked permission or no access even for reading of report 24e. The entire master reporting template 18 has copy permission for the OEM personnel so that the master reporting template 18 may be copied and communicated to each of multiple vehicle operators 14.

Figure 3:
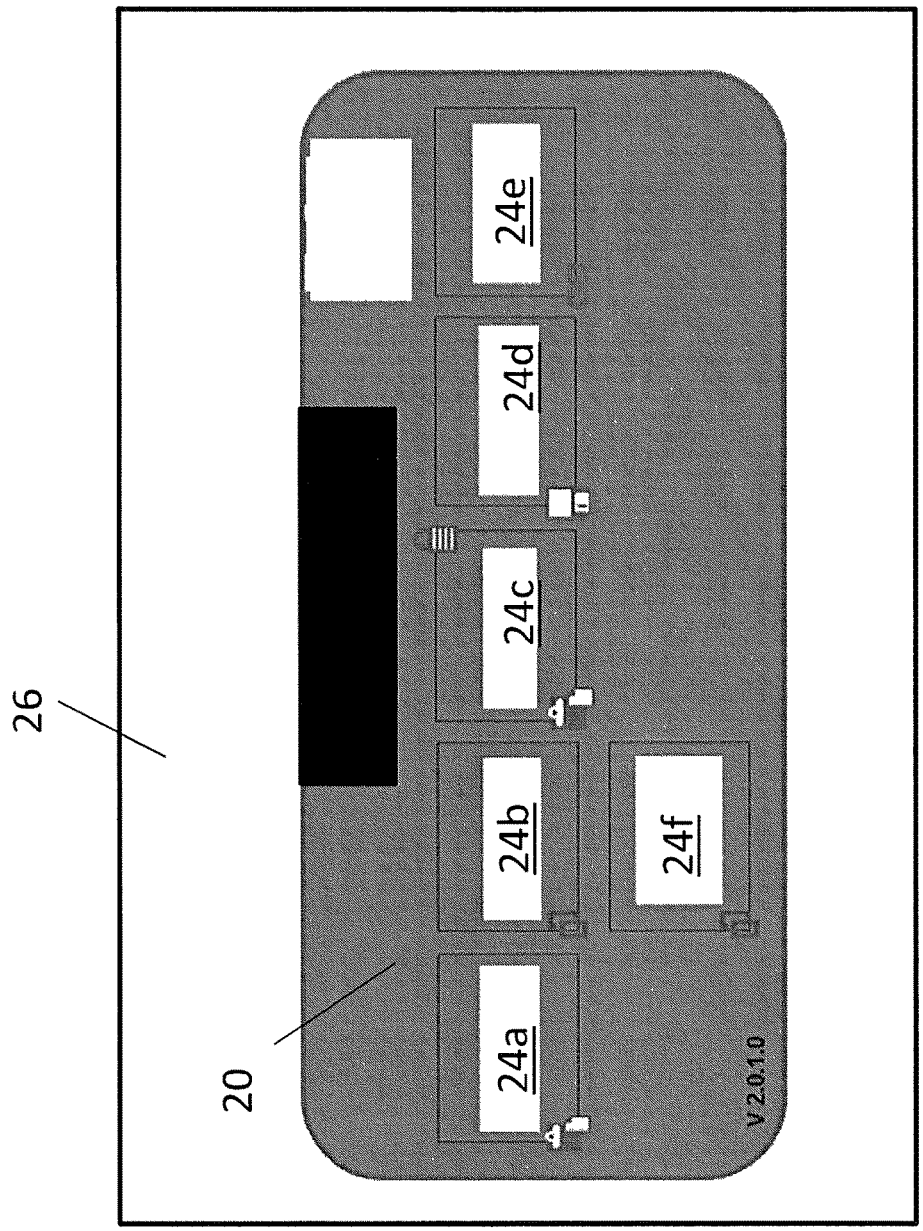
FIG. 3 is a schematic view of an inherited report master template.

Referring now to FIG. 3, the vehicle operator 14 has an operator server 26 or other data storage and processing device at which the master reporting template 18 is received and is the inherited reporting template 20 for the vehicle operator 14. The vehicle operator 14 has modify privileges for the inherited reporting template 20 so, for example, reports such as report 24f can be added by the vehicle operator 14 to report additional data of interest to the vehicle operator 14. Regarding individual reports in the inherited reporting template 20, the vehicle operator 14 may have different privileges for each of reports 24a-24e as set by the OEM 12 before the master reporting template 18 is communicated to the vehicle operators 14.

Figure 4:
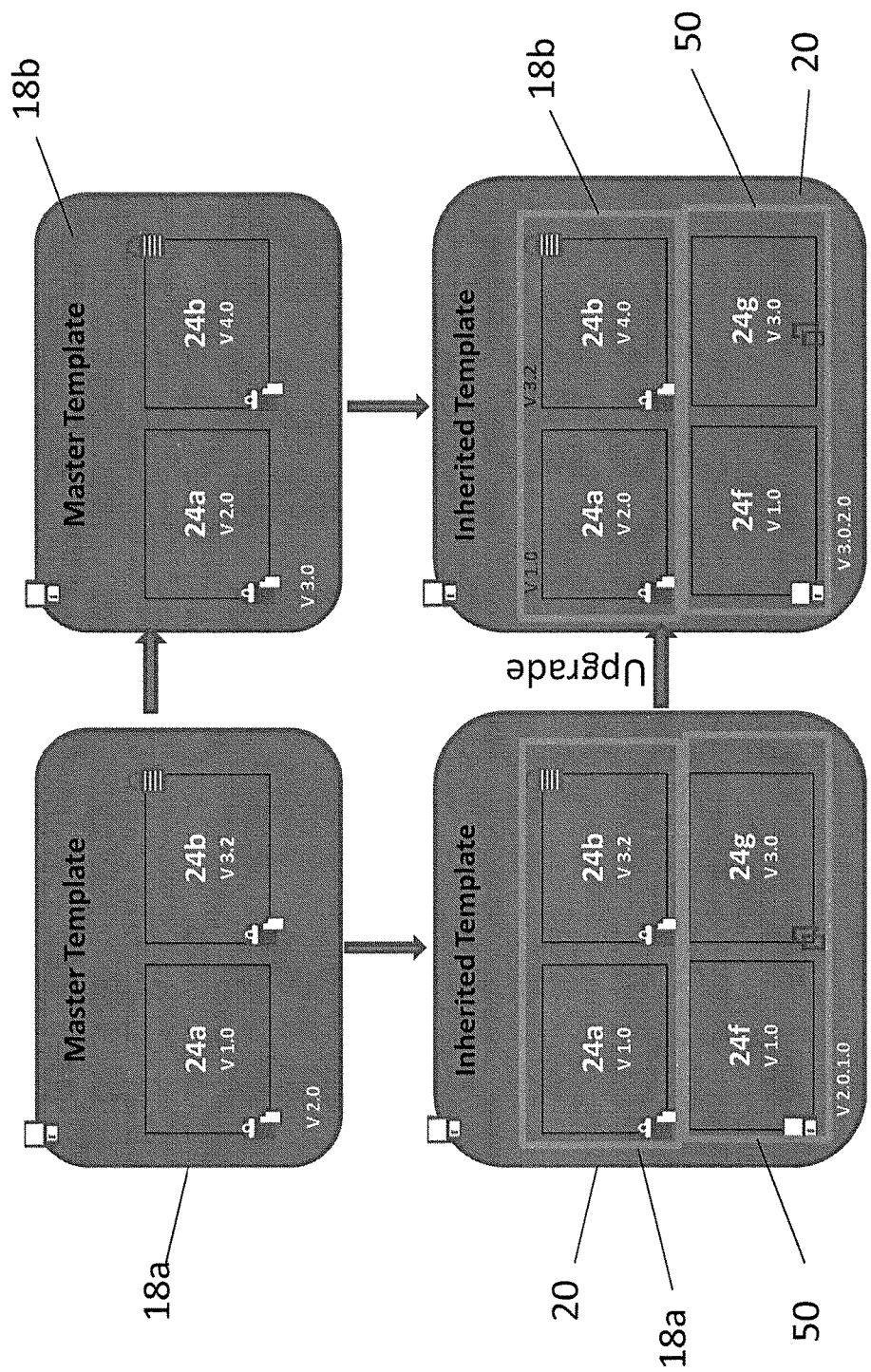
FIG. 4 is a schematic illustration of revision control for a master reporting template and an inherited reporting template.

Referring now to FIG. 4, revision and inheritance of the master reporting template 18 is illustrated by way of example. In FIG. 4, master reporting template 18a is at version 2.0 and includes report 24a at revision level 1.0 and report 24b at revision level 3.2. This master reporting template 18a is communicated to vehicle operator 14 where it is included in inherited reporting template 20a, version 2.0.1.0 which includes reports 24a and 24b, along with additional vehicle operator reports 50 for reports 24f and 24g. When the master reporting template 18a is revised to version 3.0 18b with report 24a revised to version 2.0 and report 24b revised to version 4.0, the vehicle operator reports 24f and 24g are copied into the new upgraded inherited reporting template 20b, version 3.0.2.0.

Figure 5:
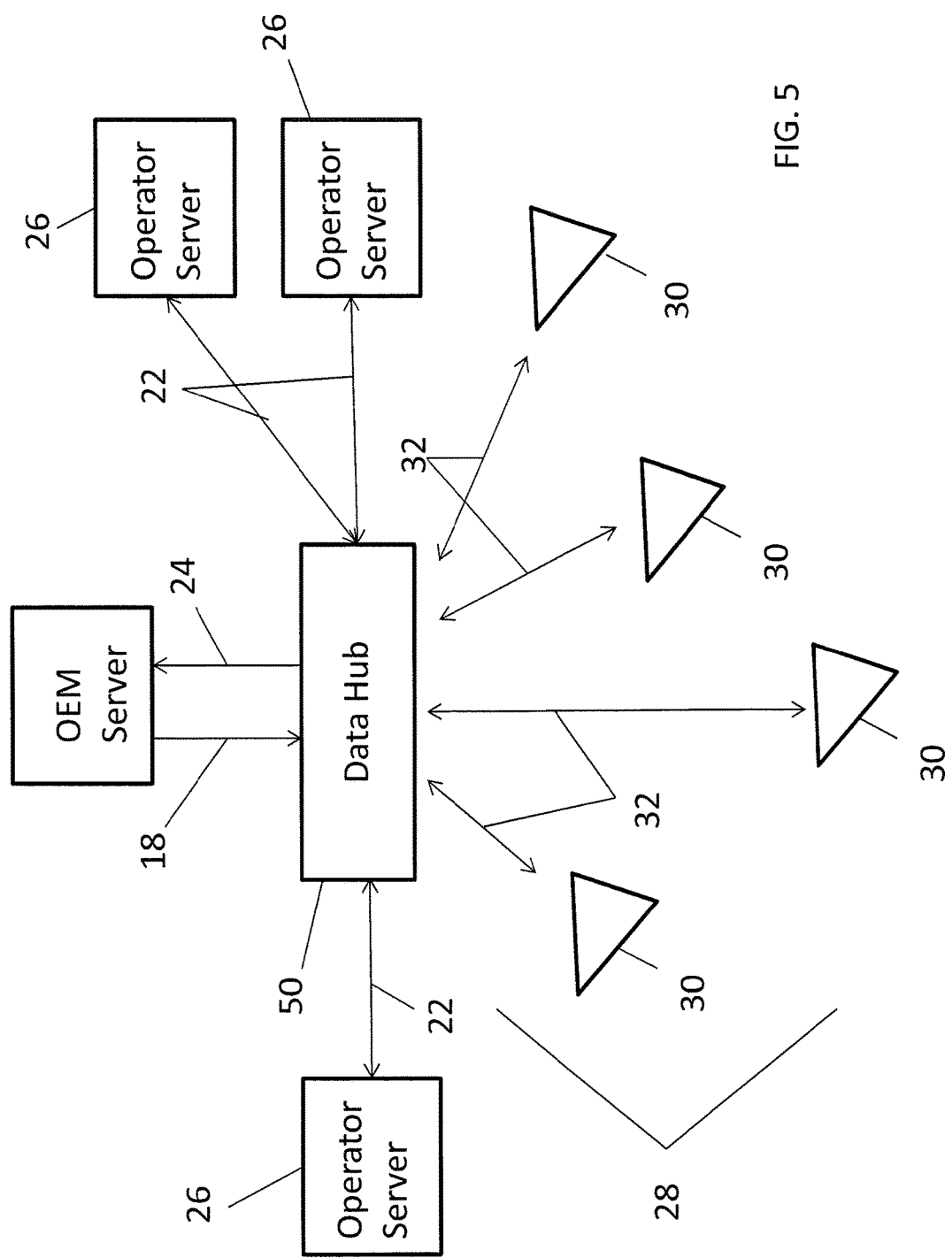
FIG. 5 is a schematic illustration of a data communication system for a vehicle fleet.

Referring now to FIG. 5, in some embodiments, the data collection and reporting system 10 utilizes a centralized data hub 50 for collection of report data from multiple vehicle operators 14. Each vehicle operator 14 operates a portion of a vehicle fleet 28, which may be, for example, a fleet of aircraft or alternatively may be a fleet of automobiles, trucks, trains, ships or the like. Further, one skilled in the art will readily appreciate that the present disclosure may be applied to non-vehicular uses as well. In this embodiment, the OEM 12 provides the master reporting template 18 including one or more OEM reports 24 to the data hub 50, with each vehicle operator 14 operator providing additional operator specific reports 22 to the data hub 50. The data hub 50 is operably connected to communicate with individual aircraft 30 of the vehicle fleet 28 via a two-way electronic connection 32 with the aircraft 30. In some embodiments, the electronic connection 32 is wireless via, for example, a Wi-fi or cellular connection or similarly capable wirelessly technology. In some embodiments, the data hub 50 directly communicates with the individual vehicles 30, while in other embodiments the communication may be via the operator server 26.

Figure 6:
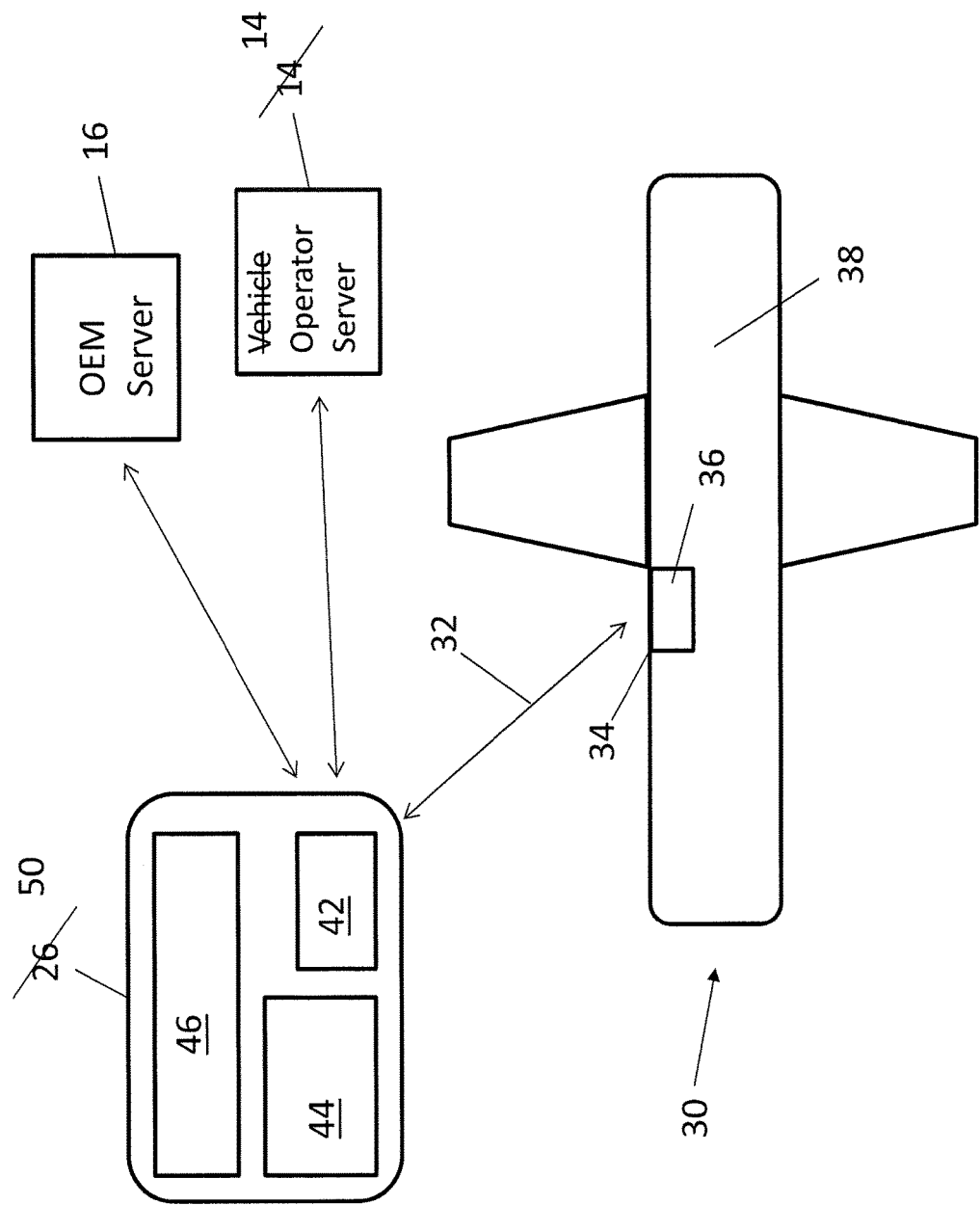
FIG. 6 is schematic illustration of data collection and reporting from a vehicle of a fleet.

Referring to FIG. 6, the data hub 50 is configured to communicate with a data port 34 of each vehicle 30 in the vehicle fleet 28. The data port 34 is located at a data collector 36 at, for example, a vehicle-frame 38 or an engine (not shown) of the vehicle 30. The data collector 36 collects data from one or more vehicle systems while the vehicle 30 is in operation, and the collected data is communicated from the data collector 36 to the data hub 50 when the vehicle 30 is within communication range of a Wi-Fi access point or cellular tower or similar wireless connection point, such as at an vehicle-port or at a service facility.

In some embodiments, the data hub 50 includes a communications portion 42 and also a data processing portion 44 and a data storage portion 46. The data hub 50 is configured to collect the required data from the data port 34 via the communications portion 42 and store and/or format the collected data into report forms utilizing the data processing portion 44 and/or the data storage portion 46 for communication to the OEM server 16 and to the operator server 26. Once the data is collected and processed at the data hub 50, the one or more OEM reports 24 are communicated to the OEM server 16 and the operator specific reports 22 are communicated to the operator server 26 of the vehicle operator 14 that requested the operator specific reports 22. While the OEM reports 24 from each requested aircraft 30 from each vehicle operator 14 are communicated to the OEM server 16, the operator specific reports 22 are segregated by vehicle operator 14, with each operator server 26 only receiving operator specific reports 22 for the vehicles 30 operated by that particular vehicle operator 14. In some embodiments, the OEM server 16 may operate as the data hub.

Figure 7:
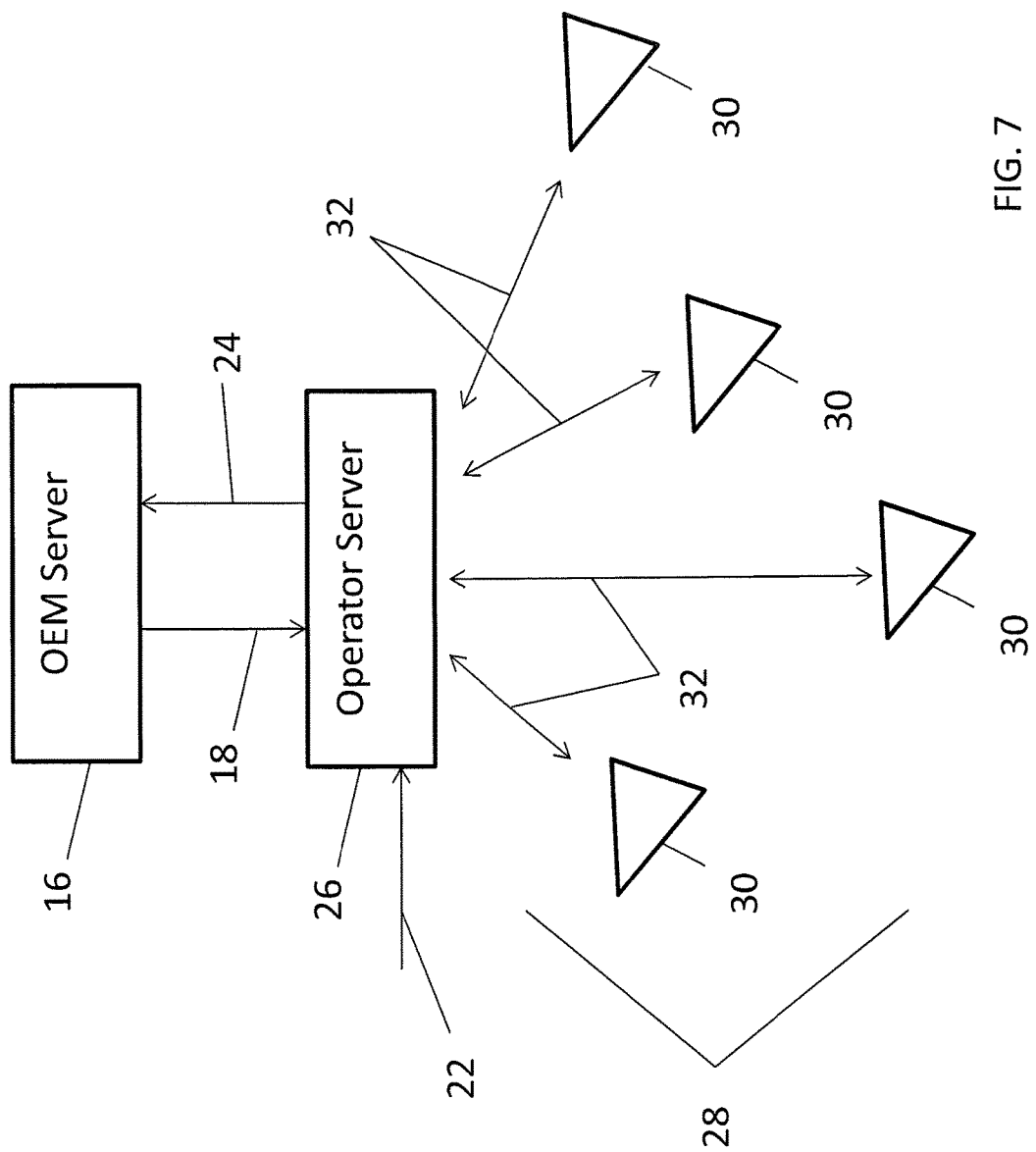
FIG. 7 is a schematic illustration of another embodiment of a data communication system for a vehicle fleet.

It is to be appreciated that while a centralized data hub 50 is shown in FIG. 5, in other embodiments, such as shown in FIG. 7, each operator server 26 is utilized as a data hub. In FIG. 7, the OEM server 16 provides master reporting templates 18 to each of the operator servers 26 to which the operator's operator specific reports 22 are added. Each operator server 26 is configured for communication with individual vehicles 30 of the vehicle operator's portion of the vehicle fleet 28. The collected data from the vehicles 30 is processed at the operator server 26 and the OEM reports 24 are communicated to the OEM server 16.

The data collection and reporting system 10 disclosed herein streamlines revision and access control of the generated data reports via the use of the access-controlled master template 18, and the limited revisions allowed by the vehicle operators 14 to the inherited reporting template 20. The automated revision control of the master template 18 ensures that the OEM desired data and reporting is performed, without the need for vehicle operators 14 to manually update reports. Further, the master template 18 ensures that reporting is consistent across vehicle operators 14.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of data collection and reporting for a vehicle fleet, comprising:
   defining a master reporting template at an original equipment manufacturer, the master reporting template including one or more original equipment manufacturer report structures for original equipment manufacturer use;
   communicating the master reporting template from the original equipment manufacturer to one or more vehicle operators;
   defining an inherited reporting template at the vehicle operator, the inherited reporting template including the one or more original equipment manufacturer report structures configured to be modified by only the original equipment manufacturer and one or more vehicle operator report structures configured to be modified by the vehicle operator for vehicle operator use, the inherited reporting template configured to be updated automatically via updating of the master reporting template by the original equipment manufacturer;
   collecting data at a data hub from one or more vehicles of the vehicle fleet via a data port at the one or more vehicles operably connected to the data hub, the data collection based on the contents of the inherited reporting template;
   transmitting completed reports based on the master reporting template from the data hub to the original equipment manufacturer server; and
   transmitting completed reports based on the vehicle operator report structures to a vehicle operator server.

2. The method of claim 1, further comprising communicating the master reporting template to two or more vehicle operators;
   wherein a first vehicle operator defines a first inherited reporting template having a first set of vehicle operator report structures; and
   wherein a second vehicle operator defines a second inherited reporting template having a second set of operator report structures different from the first set of vehicle operator report structures.

3. The method of claim 1, further comprising:
   modifying the master reporting template;
   communicating the master reporting template from the original equipment manufacturer to one or more vehicle operators; and
   adding the one or more vehicle operator report structures to the master reporting template at the one or more vehicle operators defining a revised inherited reporting template.

4. The method of claim 3, wherein the master reporting template is definable only at the original equipment manufacturer.

5. The method of claim 1, wherein the master reporting template is definable only at the original equipment manufacturer.

6. The method of claim 1, wherein the vehicle fleet is an aircraft fleet.

7. The method of claim 1, wherein the one or more original equipment manufacturer report structures include one or more of oil condition report, a gaspath temperature and pressure report, a FADEC condition report, a hydraulic system report, or a flight control system report.

8. A data collection and reporting system for a vehicle fleet, comprising:
an original equipment manufacturer data center including a master reporting template defined by the original equipment manufacturer and configured to be modified by only the original equipment manufacturer, the master reporting template including one or more original equipment manufacturer report structures for original equipment manufacturer use;
a vehicle operator data center including one or more vehicle operator report structures for vehicle operator use, the master reporting template and the one or more vehicle operator report structures together defining an inherited reporting template for the vehicle operator, the inherited reporting template configured to be updated automatically via updtating of the master reporting template by the original equipment manufacturer; and
a data hub operably connectible to selected vehicles of the vehicle fleet and configured to:
collect data from the selected vehicles;
communicate collected data to the vehicle operator data center per the one or more vehicle operator report structures; and
communicate collected data to the original equipment manufacturer data center per the one or more original equipment manufacturer report structures.

9. The data collection and reporting system of claim 8, further comprising a data port at each vehicle of the vehicle fleet, the vehicle configured for direct two-way communication with the data hub via the data port.

10. The data collection and reporting system of claim 9, wherein the data port is configured to:
communicate data collection requirements from the data hub to the vehicle; and
receive collected data from the vehicle.

11. The data collection and reporting system of claim 8, further comprising two or more vehicle operator data centers operably connected to the data hub.

12. The data collection and reporting system of claim 11, wherein:
a first vehicle operator data center of the two or more vehicle operator data centers includes a first set of vehicle operator report structures; and
a second vehicle operator data center of the two or more vehicle operator data centers includes a second set of vehicle operator report structures different from the first set of vehicle operator report structures.

13. The data collection and reporting system of claim 8, wherein the master reporting template configured for modification only by the original equipment manufacturer.

14. The data collection and reporting system of claim 8, wherein the vehicle fleet is an aircraft fleet.

15. The data collection and reporting system of claim 8, wherein the one or more original equipment manufacturer report structures include one or more of oil condition report, a gaspath temperature and pressure report, a FADEC condition report, a hydraulic system report, or a flight control system report.

16. A vehicle fleet comprising:
a plurality of vehicles operated by one or more vehicle operators; and
a data collection and reporting system in selective operable communication with the plurality of vehicles, the data collection and reporting system including:
an original equipment manufacturer data center including a master reporting template defined by an original equipment manufacturer, the master reporting template including one or more original equipment manufacturer report structures for original equipment manufacturer use;
a vehicle operator data center including one or more vehicle operator report structures for vehicle operator use, the master reporting template and the one or more vehicle operator report structures together defining an inherited reporting template for the vehicle operator, the inherited reporting template configured to be updated automatically via updtating of the master reporting template by the original equipment manufacturer; and
a data hub operably connectible to the plurality of vehicles of the vehicle fleet and configured to:
collect data from the plurality of vehicles;
communicate collected data to the vehicle operator data center per the one or more vehicle operator report structures; and
communicate collected data to the original equipment manufacturer data center per the one or more original equipment manufacturer report structures.

17. The vehicle fleet of claim 16, further comprising a data port at each vehicle of the vehicle fleet, the data hub configured for direct two-way communication with the data port to:
communicate data collection requirements from the data hub to the vehicle; and
receive collected data from the vehicle.

18. The vehicle fleet of claim 16, further comprising two or more vehicle operator data centers operably connected to the data hub, wherein:
a first vehicle operator data center of the two or more vehicle operator data centers includes a first set of vehicle operator report structures; and
a second vehicle operator data center of the two or more vehicle operator data centers includes a second set of vehicle operator report structures different from the first set of vehicle operator report structures.

19. The vehicle fleet of claim 16, wherein the one or more original equipment manufacturer report structures include one or more of oil condition report, a gaspath temperature and pressure report, a FADEC condition report, a hydraulic system report, or a flight control system report.

* * * * *